US011990290B2

(12) United States Patent
Wu et al.

(10) Patent No.: US 11,990,290 B2
(45) Date of Patent: May 21, 2024

(54) DETACHABLE PUSHBUTTON STRUCTURE

(71) Applicants: SWITCHLAB INC., New Taipei (TW); SWITCHLAB (SHANGHAI) CO., LTD., Shanghai (CN); GAOCHENG ELECTRONICS CO., LTD., Shenzhen (CN)

(72) Inventors: Chih-Yuan Wu, New Taipei (TW); Chih-Hao Sung, New Taipei (TW); Yi-Wen Qiu, New Taipei (TW)

(73) Assignees: Switchlab Inc., New Taipei (TW); Switchlab (Shanghai) Co., Ltd., Shanghai (CN); Gaocheng Electronics Co., Ltd., Guangdong (CN)

( * ) Notice: Subject to any disclaimer, the term of this patent is extended or adjusted under 35 U.S.C. 154(b) by 0 days.

(21) Appl. No.: 17/819,404

(22) Filed: Aug. 12, 2022

(65) Prior Publication Data

US 2023/0094921 A1 Mar. 30, 2023

(30) Foreign Application Priority Data

Sep. 29, 2021 (TW) ................................ 110136291

(51) Int. Cl.
*H01H 13/14* (2006.01)
*H01H 13/04* (2006.01)
*H01H 13/20* (2006.01)

(52) U.S. Cl.
CPC ........... *H01H 13/14* (2013.01); *H01H 13/04* (2013.01); *H01H 13/20* (2013.01); *H01H 2233/07* (2013.01)

(58) Field of Classification Search
CPC ........ H01H 13/14; H01H 13/04; H01H 13/20; H01H 2233/07; H01H 13/023; H01H 13/06; H01H 13/56; H01H 3/02; H01H 13/50; H01H 13/10
See application file for complete search history.

(56) References Cited

U.S. PATENT DOCUMENTS

| | | | | |
|---|---|---|---|---|
| 9,653,235 B2 * | 5/2017 | Shimoyama | ........... | H01H 3/022 |
| 10,068,729 B2 * | 9/2018 | Shimoyama | ......... | H01H 25/008 |
| 10,566,149 B2 * | 2/2020 | Wu | .......................... | H01H 3/38 |

* cited by examiner

*Primary Examiner* — Lheiren Mae A Caroc
(74) *Attorney, Agent, or Firm* — Rosenberg, Klein & Lee

(57) ABSTRACT

A detachable pushbutton structure includes a case seat which is formed with an internal receiving space for receiving a base seat and a linking member. The base seat has multiple contact legs. The linking member is drivable to control the respective contact legs to form different conducting states. A support seat connected with the linking member and has an internal penetrating hole. A light-emitting member is received in the penetrating hole and connected with the base seat. A connected section is disposed on an outer side of the support seat. A cap assembly can be tightly capped on the penetrating hole of the support seat. A pushbutton is capped on the cap assembly and has a connection section detachably connected with the connected section. A protective ring securely connected between an inner circumference of the receiving space and an outer circumference of the support seat.

36 Claims, 11 Drawing Sheets

DETACHABLE PUSHBUTTON STRUCTURE

BACKGROUND OF THE INVENTION

1. Field of the Invention

The present invention relates generally to a detachable pushbutton structure, and more particularly to a pushbutton structure, which is easy to clean and maintain. In addition, the pushbutton of the detachable pushbutton structure can be conveniently replaced with another pushbutton with a different mark.

2. Description of the Related Art

FIGS. 1 and 2 show a conventional high-protection pushbutton structure. The pushbutton structure mainly includes an outer case 6, a support seat 7, a protective ring 8 and a pushbutton 9. The outer case 6 is composed of a case body 61 and a securing seat 64. The securing seat 64 has a receiving space 641 penetrating through the securing seat 64. An inner flange 642 is annularly formed on a middle portion of an inner circumference of the receiving space 641. An auxiliary member (such as a nut, not shown) can cooperate with the outer circumference of the securing seat 64 to secure the securing seat 64 onto a preset panel.

The case body 61 receives therein a base seat 62, a light-emitting member 66 and a linking member 63. The base seat 62 has multiple contact legs 621 outward protruding from the outer case 6. An elastic member 632 and a locking member 65 are disposed between the linking member 63 and the case seat 62. The elastic member 632 applies an elastic force to the linking member 63 to make the linking member 63 restore to its home (not operated) position. The locking member 65 serves to keep the linking member 63 in an operated or not operated position in a specific state. (For example, when the linking member 63 is forcedly operated once, the linking member 63 is retained in the operated position, while when the linking member 63 is forcedly operated again, the linking member 63 is restored to the not operated position). By means of the above operation of the linking member 63, the respective contact legs 621 are controlled to form different conducting states. The light-emitting member 66 is connected with the base seat 62.

The support seat 7 is received in the receiving space 641 and fitted around the light-emitting member 66. An outer flange 73 is disposed on an outer circumference of one end of the support seat 7. The outer flange 73 is overlaid on and connected with the linking member 63 so as to securely connect the support seat 7 with the linking member 63.

The protective ring 8 is an elastically flexible ring-shaped structure body. An inner rim 83 and an outer rim 82 are respectively disposed on the inner and outer circumferences of the protective ring 8. A flexible section 81 is formed between the inner and outer rims 83, 82. The inner rim 83 is overlaid on the outer flange 73, while the outer rim 82 is overlaid on an end section of the case body 61.

When assembled, one end of the case body 61, which end is distal from the contact legs 621, is plugged into the securing seat 64 and secured therein. The inner flange 642 is cooperatively pressed against the upper side of the end section of the case body 61 so as to securely hold (or adhere to) the outer rim 82 of the protective ring 8. Then, the pushbutton 9 is fitted onto the upper side (one end distal from the base seat 62) of the support seat 7. The bottom section of the pushbutton 9 presses the upper side of the outer flange 73 so as to securely hold the inner rim 83 of the protective ring 8. Accordingly, the protective ring 8 is secured between the outer circumference of the pushbutton 9 and the inner circumference of the receiving space 641 of the securing seat 64. A mark cover 91 with a character, a figure or a symbol can be inlaid in a surface of the pushbutton 9.

In the above structure, when the pushbutton 9 is pressed and operated, the pushbutton 9 is sunken into the receiving space 641 of the securing seat 64. At this time, external dust, moisture or other impurities are apt to drop into the receiving space 641 from the gap between the outer circumference of the pushbutton 9 and the inner wall of the receiving space 641 to form an accumulation A accumulating on the protective ring 8. Such accumulation A not only will affect the smoothness of the operation of the pushbutton 9, but also tends to hinder the pushbutton 9 from rebounding. This will affect the normal operation of the entire pushbutton structure. Moreover, it is often needed to replace the light-emitting member 66 and maintain relevant components of the pushbutton structure. Therefore, an opening structure must be formed on the upper side of the support seat 7 to make the light-emitting member 66 and the relevant components accessible from the outer side. The opening structure is simply blocked by the pushbutton 9 on the upper side of the support seat 7. In the case that it is necessary for an operator to replace the light-emitting member 66 or maintain the relevant components, the pushbutton 9 must be detached to unblock the opening structure of the support seat 7. When performing such operation, the accumulation A is apt to drop into the support seat 7 from the opening to destroy the original protection. Therefore, in order to prevent the dust and moisture from dropping into the support seat 7, the pushbutton 9 must be such designed as to securely connect with the upper side of the support seat 7 without easy detachment (or without possibility of detachment). Under such circumstance, the accumulation A on the protective ring 8 is obstructed by the pushbutton 9 and cannot be cleaned off. After a long period of use, the amount of the accumulation A will increase. In some serious cases, the accumulation A will lead to clog of the pushbutton 9, (that is, it is impossible to push and press the pushbutton 9).

It is therefore tried by the applicant to provide a detachable pushbutton structure to solve the problem existing in the conventional high-protection pushbutton structure in practical application.

SUMMARY OF THE INVENTION

It is therefore a primary object of the present invention to provide a detachable pushbutton structure including a case seat, a support seat, a cap assembly, a pushbutton and a protective ring. The case seat is formed with an internal receiving space for receiving a base seat, a light-emitting member and a linking member. The base seat has multiple outward protruding contact legs. The linking member is drivable to control the respective contact legs to form different conducting states. The light-emitting member is assembled and connected with the base seat. The support seat is connected with the linking member and has an internal penetrating hole, in which the light-emitting member is fitted. The cap assembly can be tightly capped on the penetrating hole of the support seat. The pushbutton is capped on the cap assembly and connected with the support seat, whereby the pushbutton can be connected with the support seat to drive the support seat to drive the linking member to operate. The protective ring is securely connected between an inner circumference of the receiving space and an outer circumference of the support seat. The protective ring serves to prevent external dust, moisture or other impurities from dropping into the receiving space from the gap between the outer circumference of the pushbutton and the inner wall of the receiving space. In the case that the pushbutton is removed, the cap assembly cooperatively blocks the penetrating hole of the support seat, whereby a tool can extend into the space between the outer circumference of the pushbutton and the inner wall of the receiving space so as to clean up the accumulation, which is formed of the dust, moisture or impurities and accumulates on the protective ring. Accordingly, the accumulation is effectively prevented from affecting the operation and move of the pushbutton so as to ensure that the entire pushbutton switch can normally operate. Therefore, the present invention can achieve high-protection effect and facilitate cleaning process.

It is a further object of the present invention to provide the above detachable pushbutton structure. After the pushbutton and the cap assembly are sequentially removed, the interior of the penetrating hole of the support seat is open to outer side, whereby the replacement of the light-emitting member or other maintenance processes can be conveniently performed. Therefore, the maintenance of the detachable pushbutton structure is facilitated.

It is still a further object of the present invention to provide the above detachable pushbutton structure, in which the pushbutton can be easily removed from the cap assembly and the upper side of the support seat. Therefore, in practical application, the pushbutton of the detachable pushbutton structure can be readily replaced with another pushbutton with different mark content on the surface as necessary. Accordingly, the application range of the product is widened and the manufacturing cost is lowered.

To achieve the above and other objects, the detachable pushbutton structure of the present invention includes: a case seat formed with an internal receiving space, an opening being formed on one side of the receiving space, a base seat being disposed on the other side of the receiving space, the base seat having multiple contact legs outward protruding from the case seat, a linking member being disposed on a lateral side of the base seat for controlling the respective contact legs to form different conducting states; a support seat received in the receiving space and connected with the linking member, a penetrating hole being formed at a center of the support seat, a connected section being disposed on a lateral side of the support seat; a cap assembly having a cap plug, which can be tightly capped on the penetrating hole of the support seat; a pushbutton disposed in the opening of the receiving space, a fitting section being disposed under a bottom section of the pushbutton for fitting onto the cap plug, a connection section being also disposed under the bottom section of the pushbutton for connecting with the connected section, whereby the pushbutton can be connected with the support seat to drive the support seat to drive the linking member to operate; and a ring-shaped protective ring. An outer flange is disposed on an outer circumference of the protective ring for securely connecting with a middle portion of an inner circumference of the receiving space. An inner flange is disposed on an inner circumference of the protective ring for securely connecting with an outer circumference of the support seat. An elastically deformable flexible section is formed between the inner flange and the outer flange.

In the above detachable pushbutton structure, an inner annular shoulder section is formed on a middle portion of an inner circumference of the penetrating hole of the support seat. A sealing washer is rested on the inner annular shoulder section. The cap plug partially extends into the penetrating hole to press the sealing washer so as to achieve sealing effect.

In the above detachable pushbutton structure, an outer flange is disposed on an outer circumference of the support seat. An annular groove is disposed on the outer circumference of the support seat above the outer flange. The inner flange of the protective ring is inlaid and located in the annular groove. A stop shoulder section is annularly formed on a middle portion of the inner circumference of the receiving space. The outer flange of the protective ring is overlaid on the stop shoulder section. A securing press ring is pressed against the outer flange to locate the same.

In the above detachable pushbutton structure, a mark cover is inlaid in a surface of the pushbutton, which surface is distal from the support seat.

In the above detachable pushbutton structure, the pushbutton is made of a transparent material. A hollow section is disposed on one side of the base seat in adjacency to the receiving space. A light-emitting member is assembled and connected in the hollow section.

In the above detachable pushbutton structure, at least one connection section is disposed on one side of the support seat in adjacency to the linking member. At least one connected section is disposed on the linking member corresponding to the connection section. The connected section is connectable with the connection section.

In the above detachable pushbutton structure, the connected section has a raised block and the connection section has a connection guide split for fitting on and holding the raised block.

In the above detachable pushbutton structure, the connected section includes at least one L-shaped locating guide channel disposed on the outer circumference of the support seat. The connection section includes at least one hook section disposed on an inner circumference of the pushbutton corresponding to the locating guide channel. The hook section extends into the corresponding locating guide channel and being inserted therein.

In the above detachable pushbutton structure, a raised stopped section is disposed on the hook section of the pushbutton and a raised stop section is disposed in the locating guide channel for affecting the move of the stopped section.

In the above detachable pushbutton structure, the connected section includes at least one latch recess formed on the outer circumference of the support seat, while the connection section includes at least one latch hook disposed under the bottom section of the pushbutton and downward extending from the pushbutton corresponding to the latch recess, whereby the latch hook can extend into the corresponding latch recess to be inserted therein.

In the above detachable pushbutton structure, the connected section includes an outer thread formed on the outer circumference of the support seat, while the connection section includes an inner thread formed on the inner circumference of the pushbutton corresponding to the outer thread, whereby the inner thread can be screwed with the outer thread.

In the above detachable pushbutton structure, the connected section includes at least one lateral raised block disposed on the outer circumference of the support seat, while the connection section includes at least one extension section disposed under the bottom section of the pushbutton and downward extending from the pushbutton corresponding to the lateral raised block. A holding split is formed on the extension section for fitting on and holding the lateral raised block.

The present invention can be best understood through the following description and accompanying drawings, wherein:

DETAILED DESCRIPTION OF THE PREFERRED EMBODIMENTS

Figure 1:
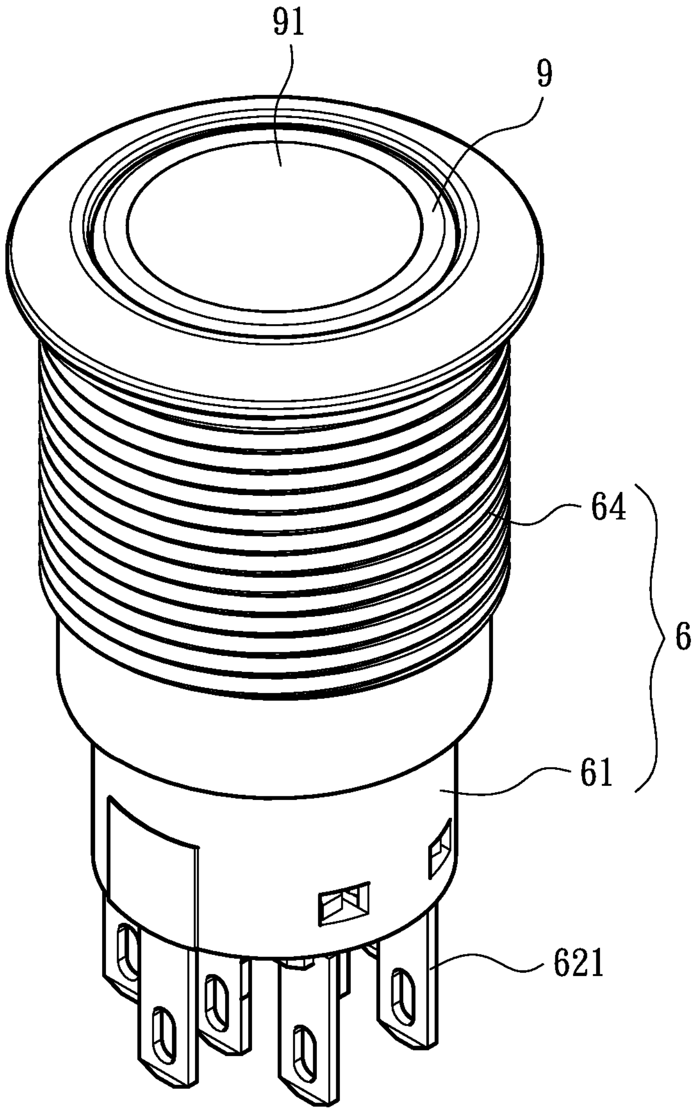
Fig. 1 PRIOR ART
FIG. 1 is a perspective assembled view of a conventional high-protection pushbutton structure.
Figure 2:
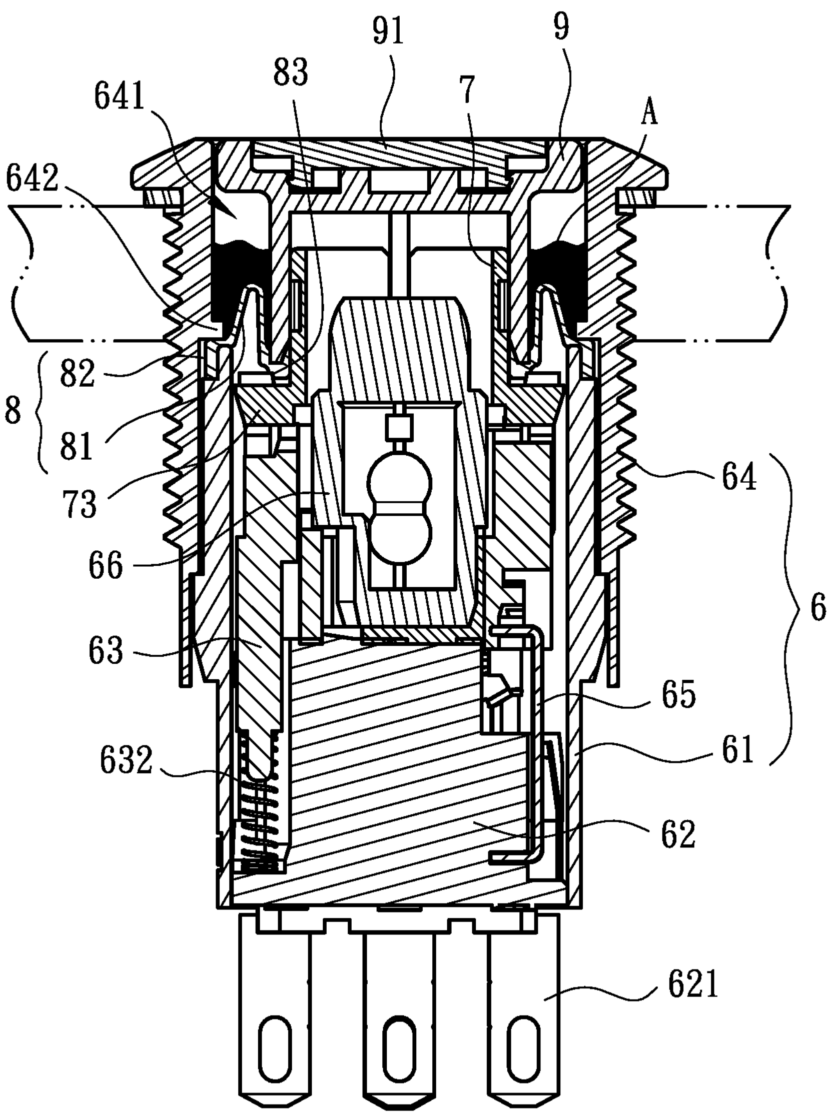
Fig. 2 PRIOR ART
FIG. 2 is a sectional assembled view of the conventional high-protection pushbutton structure.
Figure 3:
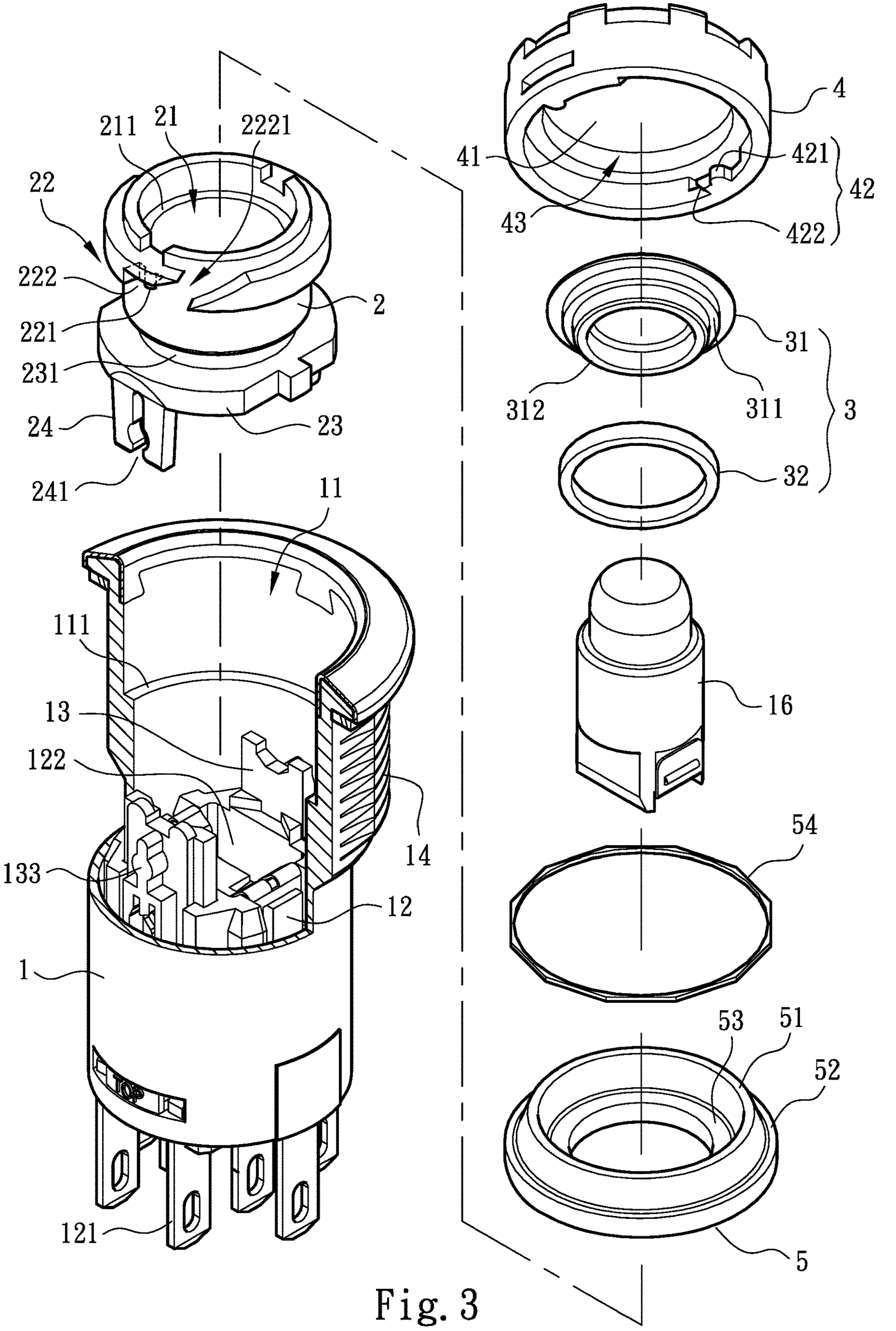
FIG. 3 is a perspective exploded view of a first embodiment of the detachable pushbutton structure of the present invention.
Figure 4:
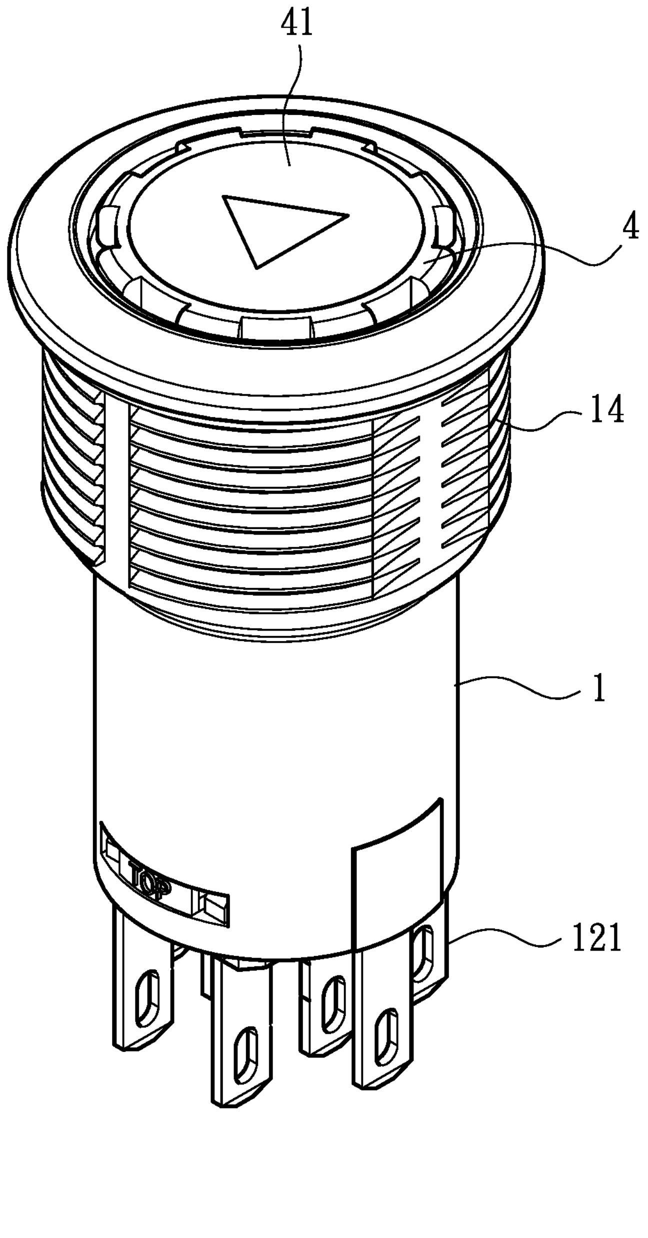
FIG. 4 is a perspective assembled view of the first embodiment of the detachable pushbutton structure of the present invention.
Figure 5:
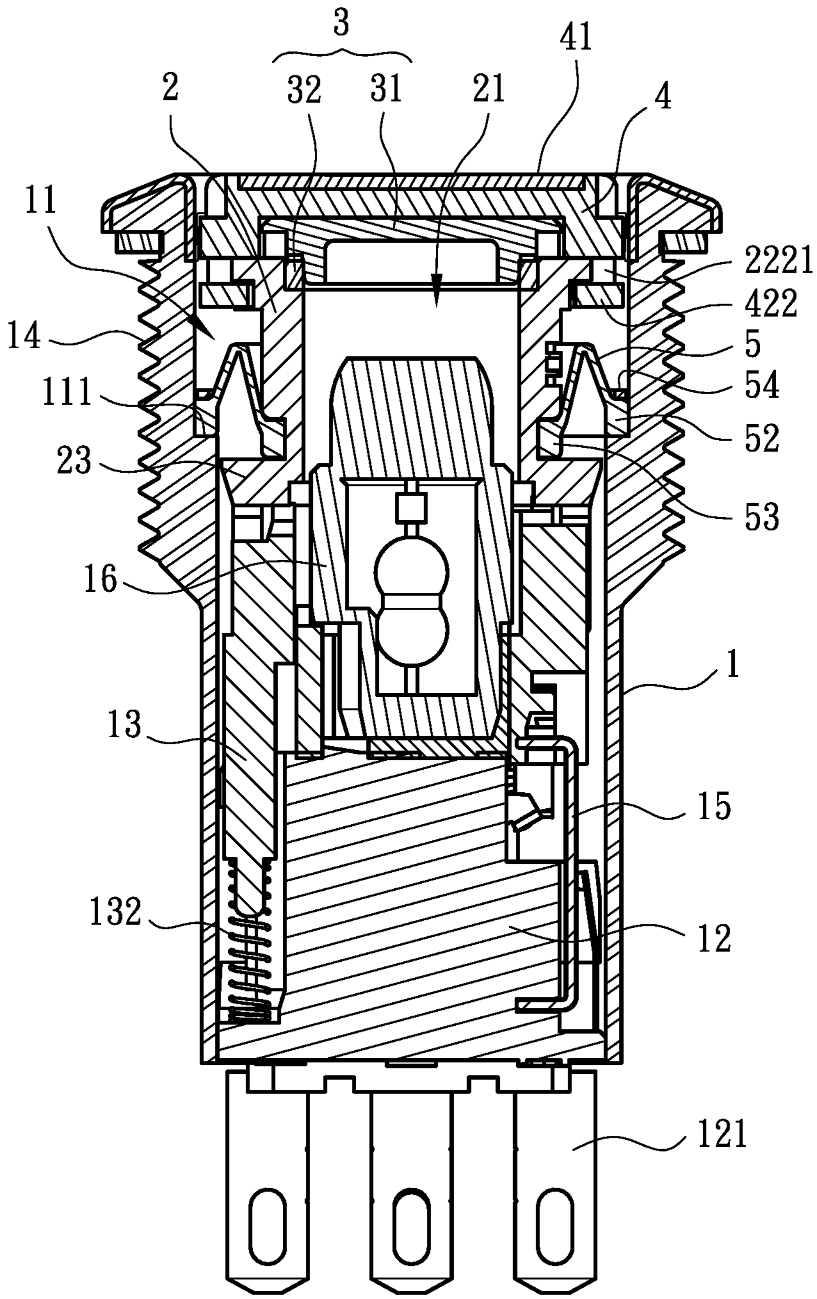
FIG. 5 is a sectional assembled view of the first embodiment of the detachable pushbutton structure of the present invention.

Please refer to FIGS. 3 to 5. According to a first embodiment, the detachable pushbutton structure of the present invention includes a case seat 1, a support seat 2, a cap assembly 3, a pushbutton 4 and a protective ring 5. The case seat 1 is formed with an internal receiving space 11. An opening is formed on one side of the receiving space 11. In addition, a stop shoulder section 111 is annularly formed on a middle portion of an inner circumference of the receiving space 11. A base seat 12 is disposed on the other side (bottom portion) of the receiving space 11. The base seat 12 has multiple contact legs 121 outward protruding from the case seat 1. A linking member 13 is disposed on a lateral side of the base seat 12 for controlling the respective contact legs 121 to form different conducting states.

In a preferred embodiment, a securing section 14, (which can be an outer thread), is disposed on an outer circumference of the case seat 1. In cooperation with an auxiliary member (such as a nut, not shown), the case seat 1 can be secured onto a preset panel by means of the securing section 14. A recessed hollow section 122 is disposed on one side of the base seat 12 (at the center thereof) in adjacency to the receiving space 11. The hollow section 122 serves to receive a light-emitting member 16 therein. An elastic member 132 and a locking member 15 are disposed between the linking member 13 and the case seat 1. The elastic member 132 applies an elastic force to the linking member 13 to make the linking member 13 restore to its home (not operated) position. The locking member 15 serves to keep the linking member 13 in an operated or not operated position in a specific state. (For example, when the linking member 13 is forcedly operated once, the linking member 13 is retained in the operated position, while when the linking member 13 is forcedly operated again, the linking member 13 is restored to the not operated position). A connected section 133, (which can be a raised block), is disposed on an outer surface of the linking member 13.

The support seat 2 is received in the receiving space 11. A penetrating hole 21 is formed through a center of the support seat 2. An inner annular shoulder section 211 is formed on a middle portion of an inner circumference of the penetrating hole 21. A connection section 24 and a connected section 22 are disposed on an outer side of the support seat 2. The connection section 24 serves to connect with the connected section 133. In a preferred embodiment, an outer flange 23 is disposed on an outer circumference of the support seat 2. An annular groove 231 is further disposed on the outer circumference of the support seat 2 above the outer flange 23. The connection section 24 has a connection guide split 241 for fitting on and holding the connected section 133 (raised block), whereby the support seat 2 is securely connected with the linking member 13.

In this embodiment, the connected section 22 has at least one L-shaped locating guide channel 222 disposed on the outer circumference of the support seat 2. One side of the locating guide channel 222 is transversely disposed on the outer circumference of the support seat 2. In addition, a raised stop section 221 is disposed at the middle of the locating guide channel 222. The other side of the locating guide channel 222 is directed to an end face of the support seat 2 and formed with a cut 2221.

The cap assembly 3 has a cap plug 31, which can be capped on the penetrating hole 21 of the support seat 2. The cap plug 31 has a hub section 312, which can be plugged into the penetrating hole 21 and fastened therein. In addition, an abutment flange 311 is annularly disposed on an outer circumference of the hub section 312.

In a preferred embodiment, the cap assembly 3 further has a sealing washer 32 disposed on the inner annular shoulder section 211 of the penetrating hole 21. When the hub section 312 is plugged into the penetrating hole 21, the abutment flange 311 presses the sealing washer 32 to achieve sealing and locating effect.

The pushbutton 4 is disposed in the opening of the receiving space 11. A fitting section 43 is disposed under a bottom section of the pushbutton 4 for fitting onto the cap plug 31. In addition, a connection section 42 is disposed under the bottom section of the pushbutton 4 for connecting with the connected section 22, whereby the pushbutton 4 can be connected with the support seat 2 to drive the support seat 2 to drive the linking member 13 to operate. In a preferred embodiment, a mark cover 41 with a character, a figure or a symbol is inlaid in a surface of the pushbutton 4, which surface is distal from the support seat 2. Moreover, the pushbutton 4 is made of a transparent material.

In this embodiment, the connection section 42 has at least one hook section 422 disposed on an inner circumference of the pushbutton 4 corresponding to the locating guide channel 222. In addition, a raised stopped section 421 is disposed on the hook section 422. When assembled, the hook section 422 of the pushbutton 4 extends from the cut 2221 into one side of the locating guide channel 222. Then, the pushbutton 4 is rotated to make the stopped section 421 of the hook section 422 transversely moved through the stop section 221 and inserted into the other side of the locating guide channel 222. After the stopped section 421 passes through the stop section 221, the stopped section 421 is restricted from moving, whereby the pushbutton 4 and the support seat 2 are securely assembled with each other without easy loosing and detachment. In the case that it is necessary to detach the pushbutton 4, a proper force is applied to the pushbutton 4 to make the pushbutton 4 rotate in a reverse direction relative to the support seat 2. Under such circumstance, the stopped section 421 can pass through the stop section 221 in a reverse direction, permitting the pushbutton 4 to be taken off from the support seat 2.

The protective ring 5 is a ring-shaped structure body. An outer flange 52 is disposed on an outer circumference of the protective ring 5 for securely connecting with the middle portion of the inner circumference of the receiving space 11. An inner flange 53 is disposed on an inner circumference of the protective ring 5 for securely connecting with the outer circumference of the support seat 2. An elastically deformable flexible section 51 is formed between the inner flange 53 and the outer flange 52.

In this embodiment, the inner flange 53 of the protective ring 5 is inlaid and located in the annular groove 231 of the outer flange 23. The outer flange 52 of the protective ring 5 is overlaid on the stop shoulder section 111 of the receiving space 11. A securing press ring 54 is pressed against the outer flange 52 to locate the same, whereby the protective ring 5 provides an isolation effect between the inner circumference of the receiving space 11 of the case seat 1 and the outer circumference of the support seat 2 so as to prevent dust, moisture or other impurities from dropping onto the surrounding of the base seat 12 and the linking member 13 to cause damage or failure or affect normal operation thereof.

Figure 6:
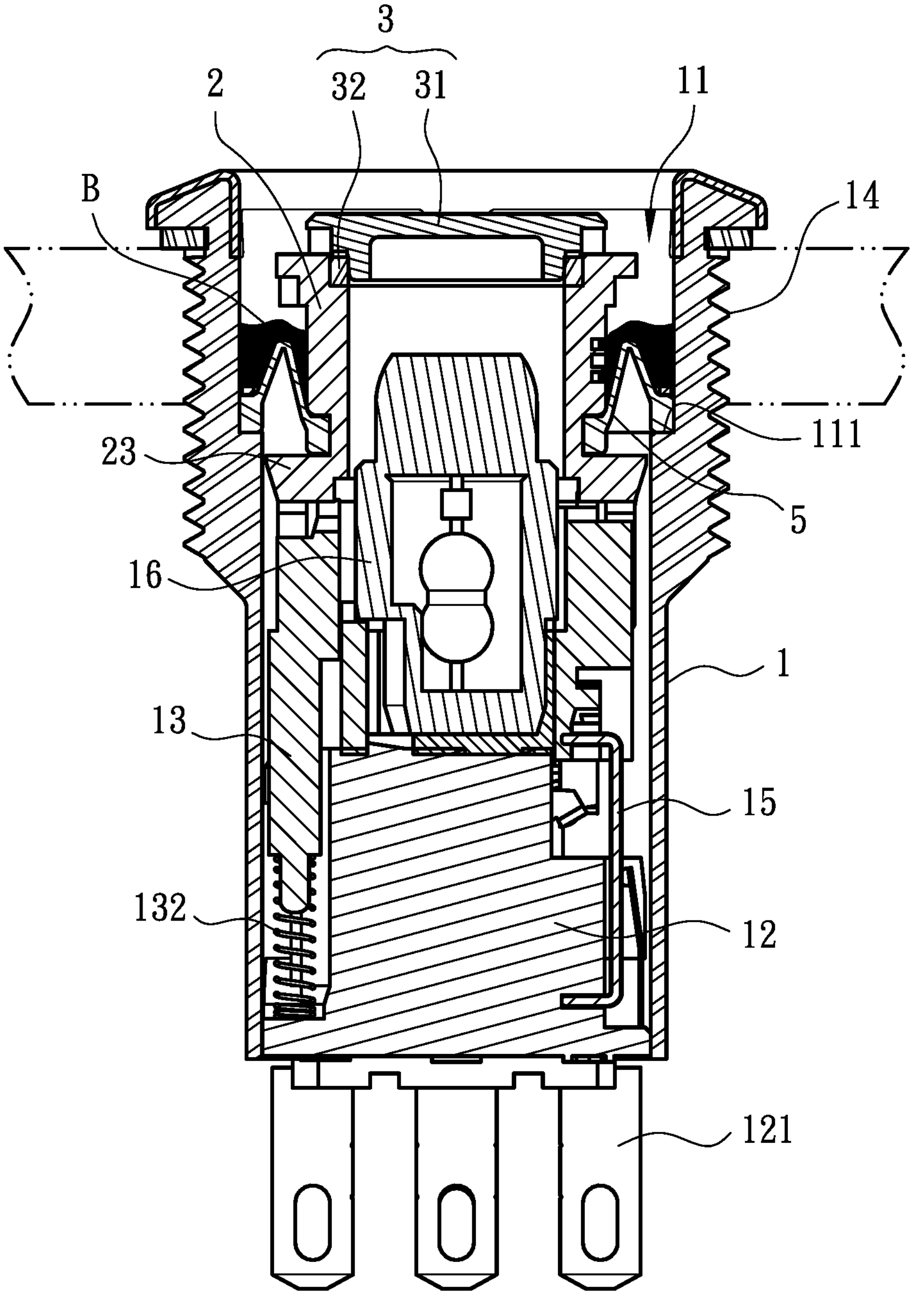
FIG. 6 is a sectional assembled view according to FIG. 5, showing that the accumulation is to be cleaned up from the first embodiment of the detachable pushbutton structure of the present invention.
Figure 7:
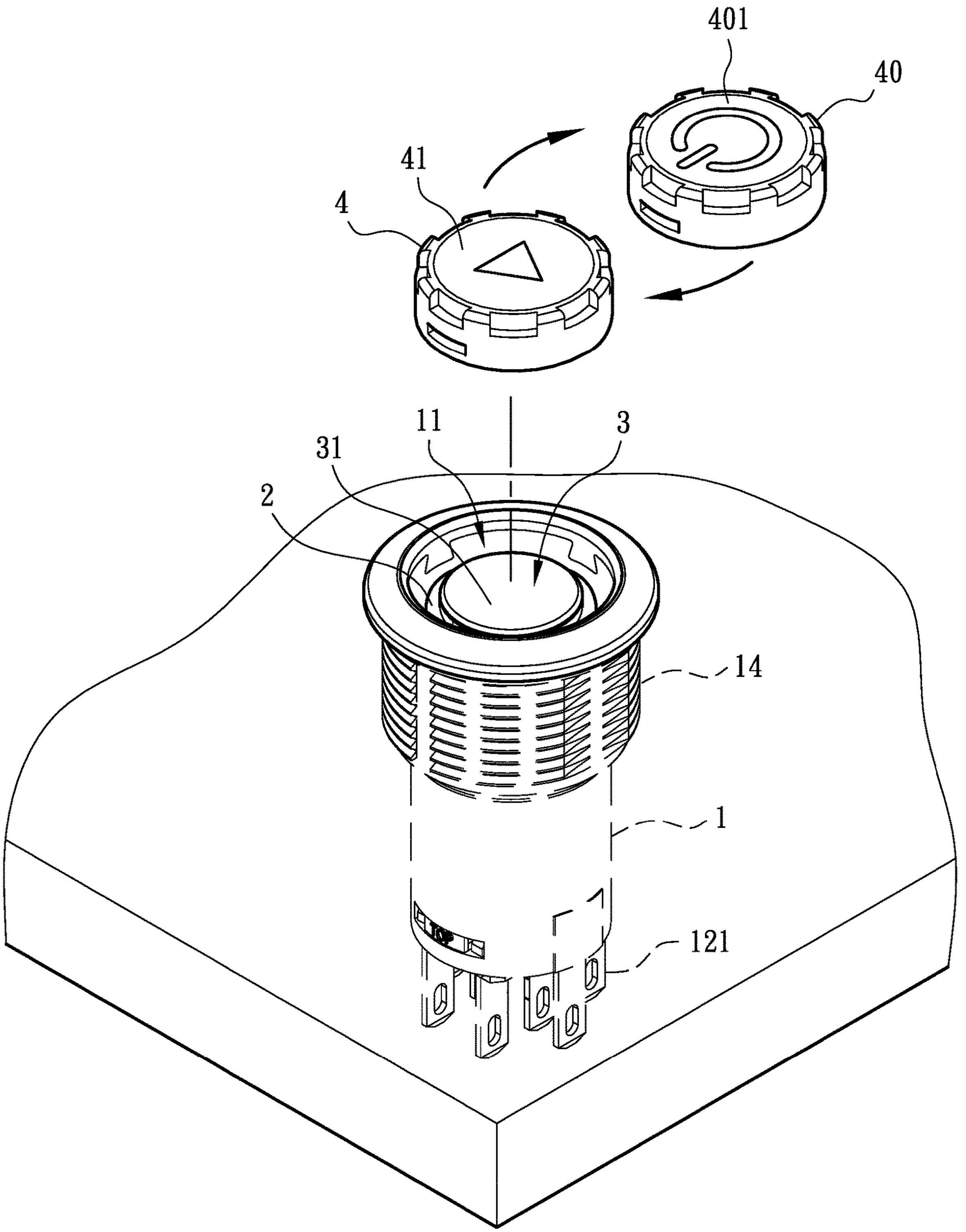
FIG. 7 is a perspective exploded view of the first embodiment of the detachable pushbutton structure of the present invention, showing that the mark cover is replaced with another mark cover.
Figure 8:
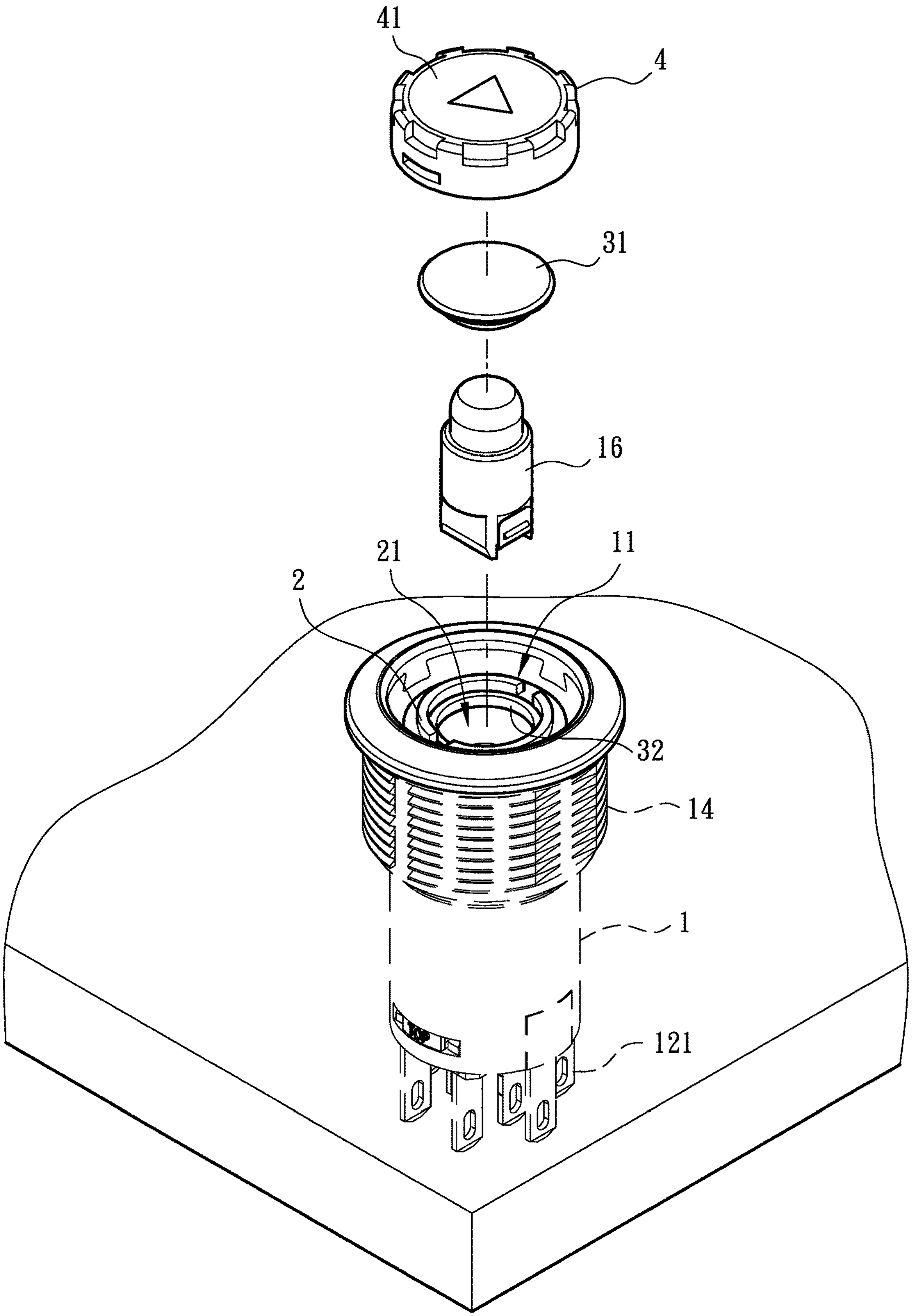
FIG. 8 is a perspective exploded view of the first embodiment of the detachable pushbutton structure of the present invention, showing that an internal maintenance of the pushbutton structure is performed.

Please now refer to FIGS. 6 to 8. In practical application of the first embodiment of the present invention, in case that an accumulation B formed of dust, moisture or other impurities accumulates between the inner circumference of the receiving space 11 of the case seat 1 and the outer circumference of the support seat 2 (or on the protective ring 5) to affect normal operation of the pushbutton 4 and the support seat 2, the pushbutton 4 is first removed from the upper side of the support seat 2 (as shown in FIG. 6). Thereafter, a tool (not shown) can be extended between the inner circumference of the receiving space 11 of the case seat 1 and the outer circumference of the support seat 2 to clean up the accumulation B. At this time, the cap assembly 3 (the cap plug 31) is kept capped on the penetrating hole 21 so that the accumulation B is effectively prevented from dropping into the penetrating hole 21 in the cleaning process. In the case that the pushbutton 4 with the mark cover 41 is replaced with another pushbutton 40 with a different mark cover 401 (as shown in FIG. 7), the character, figure or symbol of the different mark cover 401 can indicate different operation function. In the case that the light-emitting member 16 is damaged, the pushbutton 4 and the cap assembly 3 (cap plug 31) can be directly respectively removed, whereby the light-emitting member 16 is exposed to outer side through the penetrating hole 21 of the support seat 2 (as shown in FIG. 8). Under such circumstance, a tool (not shown) can be extended into the penetrating hole 21 to replace the light-emitting member 16.

Figure 9:
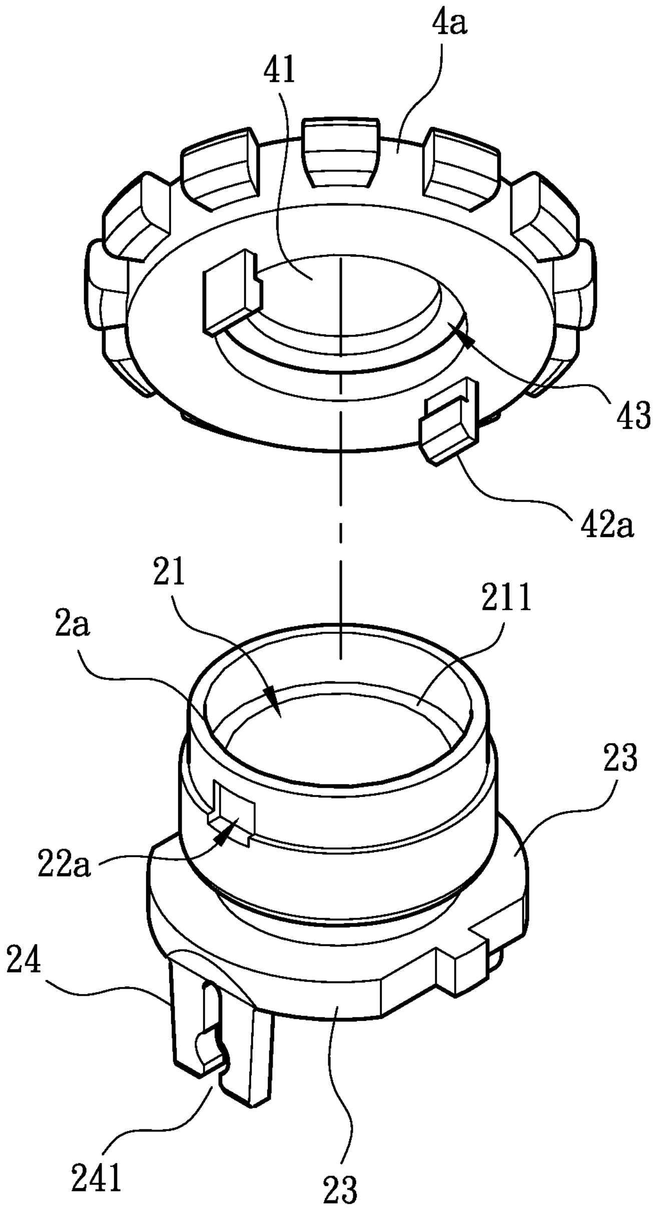
FIG. 9 is a perspective exploded view of the relevant components of a second embodiment of the detachable pushbutton structure of the present invention.

Please now refer to FIG. 9. According to a second embodiment, the detachable pushbutton structure of the present invention includes a support seat **2*a* and a pushbutton 4*a* and a cap assembly 3 and a protective ring 5 identical to those of the first embodiment. The support seat 2*a* has a connected section 22*a*, while the pushbutton 4*a* has a connection section 42*a* connectable with the connected section 22*a*. The structural features of the other parts of the support seat 2*a* and the pushbutton 4*a* are identical to the structural features of the support seat 2 and the pushbutton 4. Also, the support seat 2*a* and the pushbutton 4*a* are assembled with the case seat 1, the cap assembly 3 and the protective ring 5** in the same manner as the first embodiment.

In this embodiment, the connected section **22*a* can be at least one latch recess formed on an outer circumference of the support seat 2*a*, while the connection section 42*a* can be at least one latch hook disposed under a bottom section of the pushbutton 4*a* and downward extending from the pushbutton 4*a* corresponding to the latch recess. When assembled, the connection section 42*a* (latch hook) extends into the connected section 22*a* (latch recess) and is inserted therein, whereby the pushbutton 4*a* is securely assembled with the support seat 2*a*** without easy loosing and detachment.

Figure 10:
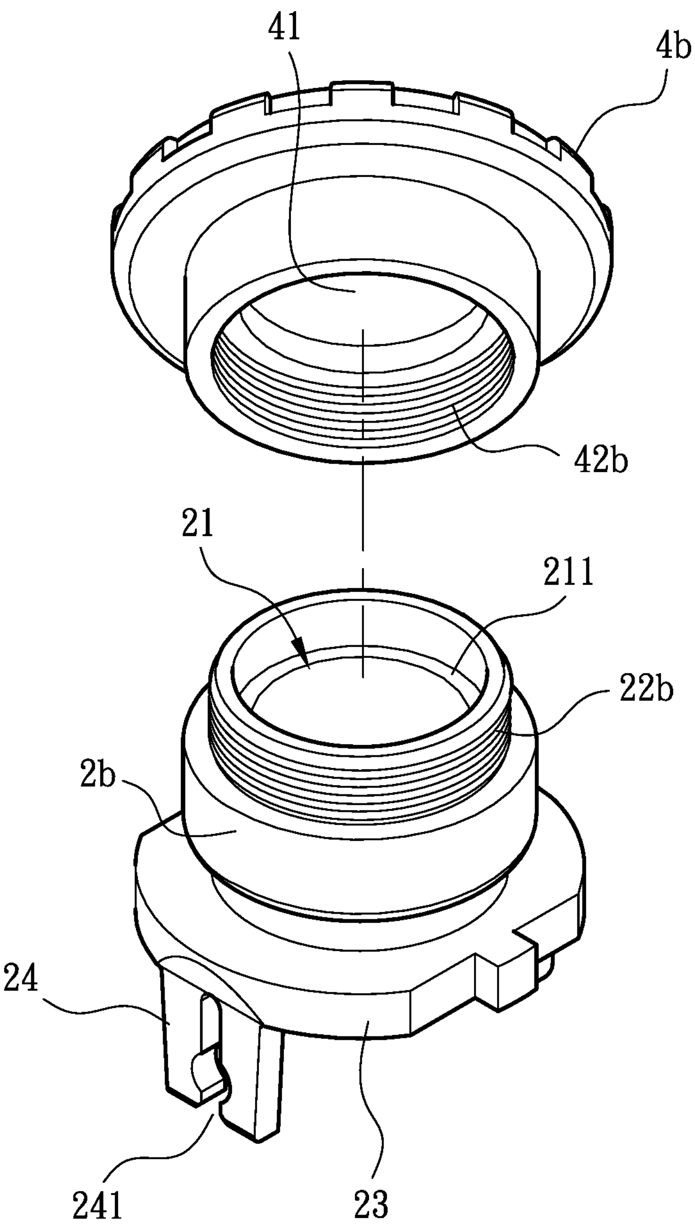
FIG. 10 is a perspective exploded view of the relevant components of a third embodiment of the detachable pushbutton structure of the present invention.

Please now refer to FIG. 10. According to a third embodiment, the detachable pushbutton structure of the present invention includes a support seat **2*b* and a pushbutton 4*b* and a cap assembly 3 and a protective ring 5 identical to those of the first embodiment. The support seat 2*b* has a connected section 22*b*, while the pushbutton 4*b* has a connection section 42*b* connectable with the connected section 22*b*. The structural features of the other parts of the support seat 2*b* and the pushbutton 4*b* are identical to the structural features of the support seat 2 and the pushbutton 4. Also, the support seat 2*b* and the pushbutton 4*b* are assembled with the case seat 1, the cap assembly 3 and the protective ring 5** in the same manner as the first embodiment.

In this embodiment, the connected section **22*b* can be an outer thread formed on an outer circumference of the support seat 2*b*, while the connection section 42*b* can be an inner thread formed on an inner circumference of the pushbutton 4*b* corresponding to the outer thread. When assembled, the connection section 42*b* (inner thread) is screwed with the connected section 22*b* (outer thread), whereby the pushbutton 4*b* is securely assembled with the support seat 2*b*** without easy loosing and detachment.

Figure 11:
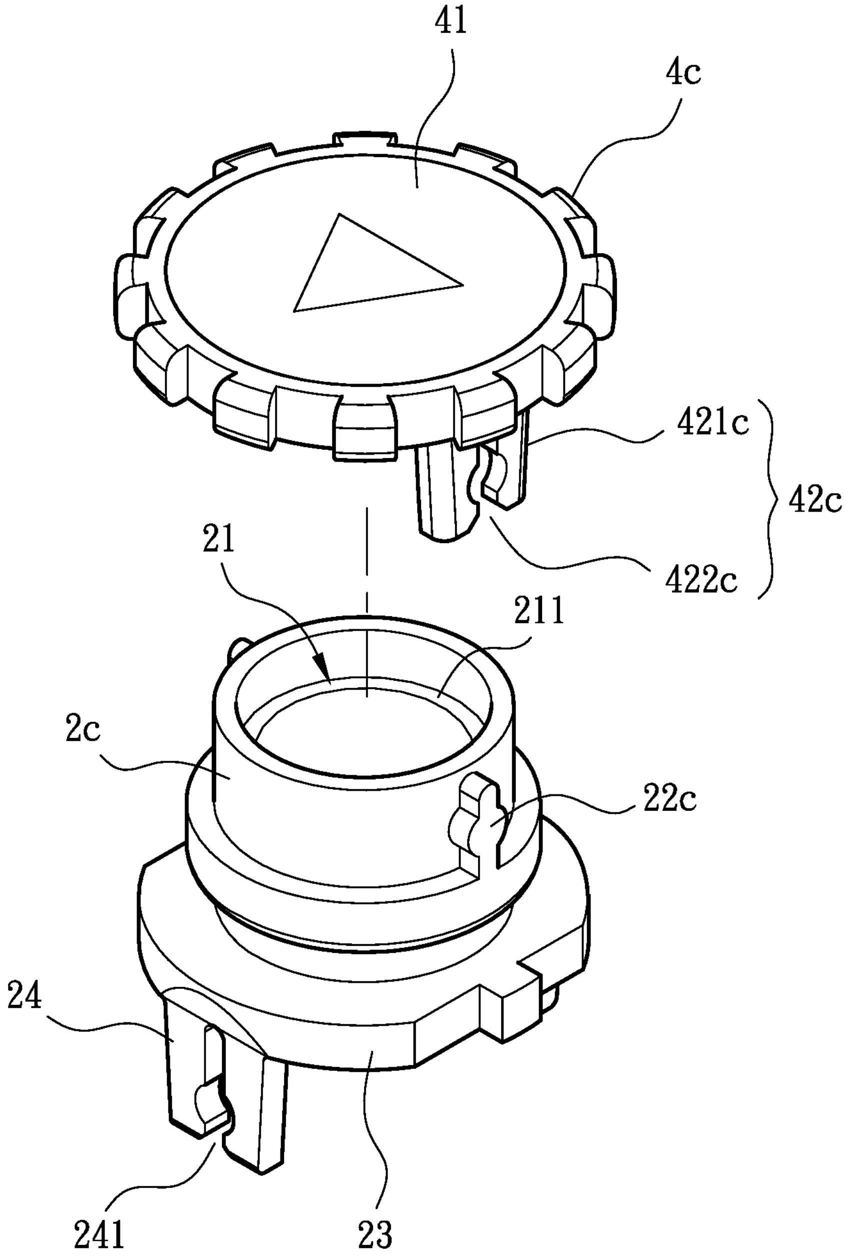
FIG. 11 is a perspective exploded view of the relevant components of a fourth embodiment of the detachable pushbutton structure of the present invention.

Please now refer to FIG. 11. According to a fourth embodiment, the detachable pushbutton structure of the present invention includes a support seat **2*c* and a pushbutton 4*c* and a cap assembly 3 and a protective ring 5 identical to those of the first embodiment. The support seat 2*c* has a connected section 22*c*, while the pushbutton 4*c* has a connection section 42*c* connectable with the connected section 22*c*. The structural features of the other parts of the support seat 2*c* and the pushbutton 4*c* are identical to the structural features of the support seat 2 and the pushbutton 4. Also, the support seat 2*c* and the pushbutton 4*c* are assembled with the case seat 1, the cap assembly 3 and the protective ring 5** in the same manner as the first embodiment.

In this embodiment, the connected section **22*c* can be at least one lateral raised block disposed on an outer circumference of the support seat 2*c*, while the connection section 42*c* has at least one extension section 421*c* disposed under a bottom section of the pushbutton 4***c* and downward extending from the pushbutton 4*c* corresponding to the lateral raised block. In addition, a holding split 422*c* is formed on the extension section 421*c* for fitting on and holding the connected section 22*c* (lateral raised block). Accordingly, the pushbutton 4*c* and the support seat 2*c* can be securely assembled with each other without easy loosing and detachment.

In conclusion, the detachable pushbutton structure of the present invention can truly facilitate cleaning and maintenance process. In addition, the pushbutton of the detachable pushbutton structure can be replaced with another pushbutton with different mark content as necessary. Moreover, the detachable pushbutton structure of the present invention can be more conveniently used and has wider application range. Therefore, the detachable pushbutton structure of the present invention is inventive and advanced.

The above embodiments are only used to illustrate the present invention, not intended to limit the scope thereof. Many modifications of the above embodiments can be made without departing from the spirit of the present invention.

What is claimed is:

1. A detachable pushbutton structure comprising:

a case seat formed with an internal receiving space, an opening being formed on one side of the receiving space, a base seat being disposed on an other side of the receiving space, the base seat having multiple contact legs outward protruding from the case seat, a linking member being disposed on a lateral side of the base seat for controlling respective contact legs to form different conducting states;

support seat received in the receiving space and connected with the linking member, a penetrating hole being formed at a center of the support seat, a connected section being disposed on a lateral side of the support seat;

a cap assembly having a cap plug, which can be tightly capped on the penetrating hole of the support seat;

a pushbutton disposed in the opening of the receiving space, a fitting section being disposed under a bottom section of the pushbutton for fitting onto the cap plug, a connection section also disposed under the bottom section of the pushbutton for connecting with the connected section, whereby the pushbutton can be connected with the support seat to drive the support seat to drive the linking member to operate; and a ring-shaped protective ring, an outer flange being disposed on an outer circumference of the protective ring for securely connecting with a middle portion of an inner circumference of the receiving space, an inner flange being disposed on an inner circumference of the protective ring for securely connecting with an outer circumference of the support seat, an elastically deformable flexible section being formed between the inner flange and the outer flange.

2. The detachable pushbutton structure as claimed in claim 1, wherein an inner annular shoulder section is formed on a middle portion of an inner circumference of the penetrating hole of the support seat, a sealing washer rested on the inner annular shoulder section, the cap plug partially extending into the penetrating hole to press the sealing washer so as to achieve a sealing effect.

3. The detachable pushbutton structure as claimed in claim 2, wherein an outer flange is disposed on an outer circumference of the support seat, an annular groove being disposed on the outer circumference of the support seat above the outer flange, the inner flange of the protective ring being inlaid and located in the annular groove, a stop shoulder section being annularly formed on a middle portion of the inner circumference of the receiving space, the outer flange of the protective ring being overlaid on the stop shoulder section, a securing press ring being pressed against the outer flange.

4. The detachable pushbutton structure as claimed in claim 3, wherein the pushbutton is made of a transparent material, a hollow section being disposed on one side of the base seat in adjacency to the receiving space, a light-emitting member being assembled and connected in the hollow section, a mark cover is inlaid in a surface of the pushbutton, which surface is distal from the support seat.

5. The detachable pushbutton structure as claimed in claim 3, wherein at least one connection section is disposed on one side of the support seat in adjacency to the linking member, at least one connected section being disposed on the linking member corresponding to the connection section, the connected section being connectable with the connection section.

6. The detachable pushbutton structure as claimed in claim 5, wherein the connected section has a raised block and the connection section has a connection guide split for fitting on and holding the raised block.

7. The detachable pushbutton structure as claimed in claim 3, wherein the connected section includes at least one L-shaped locating guide channel disposed on the outer circumference of the support seat, the connection section including at least one hook section disposed on an inner circumference of the pushbutton corresponding to the locating guide channel, the hook section extending into the corresponding locating guide channel and being inserted therein.

8. The detachable pushbutton structure as claimed in claim 7, wherein a raised stopped section is disposed on the hook section of the pushbutton and a raised stop section is disposed in the locating guide channel for affecting a move of the stopped section.

9. The detachable pushbutton structure as claimed in claim 3, wherein the connected section includes at least one latch recess formed on the outer circumference of the support seat, while the connection section includes at least one latch hook disposed under the bottom section of the pushbutton and downward extending from the pushbutton corresponding to the latch recess, whereby the latch hook can extend into the corresponding latch recess to be inserted therein.

10. The detachable pushbutton structure as claimed in claim 3, wherein the connected section includes an outer thread formed on the outer circumference of the support seat, while the connection section includes an inner thread formed on an inner circumference of the pushbutton corresponding to the outer thread, whereby the inner thread can be screwed with the outer thread.

11. The detachable pushbutton structure as claimed in claim 3, wherein the connected section includes at least one lateral raised block disposed on the outer circumference of the support seat, while the connection section includes at least one extension section disposed under the bottom section of the pushbutton and downward extending from the pushbutton corresponding to the lateral raised block, a holding split being formed on the extension section for fitting on and holding the lateral raised block.

12. The detachable pushbutton structure as claimed in claim 2, wherein the pushbutton is made of a transparent material, a hollow section being disposed on one side of the base seat in adjacency to the receiving space, a light-emitting member being assembled and connected in the hollow section, a mark cover is inlaid in a surface of the pushbutton, which surface is distal from the support seat.

13. The detachable pushbutton structure as claimed in claim 2, wherein at least one connection section is disposed on one side of the support seat in adjacency to the linking member, at least one connected section being disposed on the linking member corresponding to the connection section, the connected section being connectable with the connection section.

14. The detachable pushbutton structure as claimed in claim 13, wherein the connected section has a raised block and the connection section has a connection guide split for fitting on and holding the raised block.

15. The detachable pushbutton structure as claimed in claim 2, wherein the connected section includes at least one L-shaped locating guide channel disposed on the outer circumference of the support seat, the connection section including at least one hook section disposed on an inner circumference of the pushbutton corresponding to the locating guide channel, the hook section extending into the corresponding locating guide channel and being inserted therein.

16. The detachable pushbutton structure as claimed in claim 15, wherein a raised stopped section is disposed on the hook section of the pushbutton and a raised stop section is disposed in the locating guide channel for affecting a move of the stopped section.

17. The detachable pushbutton structure as claimed in claim 2, wherein the connected section includes at least one latch recess formed on the outer circumference of the support seat, while the connection section includes at least one latch hook disposed under the bottom section of the pushbutton and downward extending from the pushbutton corresponding to the latch recess, whereby the latch hook can extend into the corresponding latch recess to be inserted therein.

18. The detachable pushbutton structure as claimed in claim 2, wherein the connected section includes an outer thread formed on the outer circumference of the support seat, while the connection section includes an inner thread formed on an inner circumference of the pushbutton corresponding to the outer thread, whereby the inner thread can be screwed with the outer thread.

19. The detachable pushbutton structure as claimed in claim 2, wherein the connected section includes at least one lateral raised block disposed on the outer circumference of the support seat, while the connection section includes at least one extension section disposed under the bottom section of the pushbutton and downward extending from the pushbutton corresponding to the lateral raised block, a holding split being formed on the extension section for fitting on and holding the lateral raised block.

20. The detachable pushbutton structure as claimed in claim 1, wherein an outer flange is disposed on an outer circumference of the support seat, an annular groove being disposed on the outer circumference of the support seat above the outer flange, the inner flange of the protective ring being inlaid and located in the annular groove, a stop shoulder section being annularly formed on a middle portion of the inner circumference of the receiving space, the outer flange of the protective ring being overlaid on the stop shoulder section, a securing press ring being pressed against the outer flange.

21. The detachable pushbutton structure as claimed in claim 20, wherein the pushbutton is made of a transparent material, a hollow section being disposed on one side of the base seat in adjacency to the receiving space, a light-emitting member being assembled and connected in the hollow section, a mark cover is inlaid in a surface of the pushbutton, which surface is distal from the support seat.

22. The detachable pushbutton structure as claimed in claim 20, wherein at least one connection section is disposed on one side of the support seat in adjacency to the linking member, at least one connected section being disposed on the linking member corresponding to the connection section, the connected section being connectable with the connection section.

23. The detachable pushbutton structure as claimed in claim 22, wherein the connected section has a raised block and the connection section has a connection guide split for fitting on and holding the raised block.

24. The detachable pushbutton structure as claimed in claim 20, wherein the connected section includes at least one L-shaped locating guide channel disposed on the outer circumference of the support seat, the connection section including at least one hook section disposed on an inner circumference of the pushbutton corresponding to the locating guide channel, the hook section extending into the corresponding locating guide channel and being inserted therein.

25. The detachable pushbutton structure as claimed in claim 24, wherein a raised stopped section is disposed on the hook section of the pushbutton and a raised stop section is disposed in the locating guide channel for affecting a move of the stopped section.

26. The detachable pushbutton structure as claimed in claim 20, wherein the connected section includes at least one latch recess formed on the outer circumference of the support seat, while the connection section includes at least one latch hook disposed under the bottom section of the pushbutton and downward extending from the pushbutton corresponding to the latch recess, whereby the latch hook can extend into the corresponding latch recess to be inserted therein.

27. The detachable pushbutton structure as claimed in claim 20, wherein the connected section includes an outer thread formed on the outer circumference of the support seat, while the connection section includes an inner thread formed on an inner circumference of the pushbutton corresponding to the outer thread, whereby the inner thread can be screwed with the outer thread.

28. The detachable pushbutton structure as claimed in claim 20, wherein the connected section includes at least one lateral raised block disposed on the outer circumference of the support seat, while the connection section includes at least one extension section disposed under the bottom section of the pushbutton and downward extending from the pushbutton corresponding to the lateral raised block, a holding split being formed on the extension section for fitting on and holding the lateral raised block.

29. The detachable pushbutton structure as claimed in claim 1, wherein the pushbutton is made of a transparent material, a hollow section being disposed on one side of the base seat in adjacency to the receiving space, a light-emitting member being assembled and connected in the hollow section, a mark cover is inlaid in a surface of the pushbutton, which surface is distal from the support seat.

30. The detachable pushbutton structure as claimed in claim 1, wherein at least one connection section is disposed on one side of the support seat in adjacency to the linking member, at least one connected section being disposed on the linking member corresponding to the connection section, the connected section being connectable with the connection section.

31. The detachable pushbutton structure as claimed in claim 30, wherein the connected section has a raised block and the connection section has a connection guide split for fitting on and holding the raised block.

32. The detachable pushbutton structure as claimed in claim 1, wherein the connected section includes at least one L-shaped locating guide channel disposed on the outer circumference of the support seat, the connection section including at least one hook section disposed on an inner circumference of the pushbutton corresponding to the locating guide channel, the hook section extending into the corresponding locating guide channel and being inserted therein.

33. The detachable pushbutton structure as claimed in claim 32, wherein a raised stopped section is disposed on the hook section of the pushbutton and a raised stop section is disposed in the locating guide channel for affecting a move of the stopped section.

34. The detachable pushbutton structure as claimed in claim 1, wherein the connected section includes at least one latch recess formed on the outer circumference of the support seat, while the connection section includes at least one latch hook disposed under the bottom section of the pushbutton and downward extending from the pushbutton corresponding to the latch recess, whereby the latch hook can extend into the corresponding latch recess to be inserted therein.

35. The detachable pushbutton structure as claimed in claim 1, wherein the connected section includes an outer thread formed on the outer circumference of the support seat, while the connection section includes an inner thread formed on an inner circumference of the pushbutton corresponding to the outer thread, whereby the inner thread can be screwed with the outer thread.

36. The detachable pushbutton structure as claimed in claim 1, wherein the connected section includes at least one lateral raised block disposed on the outer circumference of the support seat, while the connection section includes at least one extension section disposed under the bottom section of the pushbutton and downward extending from the pushbutton corresponding to the lateral raised block, a holding split being formed on the extension section for fitting on and holding the lateral raised block.

* * * * *